(12) United States Patent
Koike

(10) Patent No.: US 6,625,103 B1
(45) Date of Patent: Sep. 23, 2003

(54) ASPHERICAL OBJECTIVE LENS FOR READING INFORMATION FROM OPTICAL DISKS OF DIFFERENT THICKNESS AND MANUFACTURING METHOD THEREFOR

(75) Inventor: Katsuhiro Koike, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/482,887

(22) Filed: Jan. 14, 2000

(30) Foreign Application Priority Data

Jan. 14, 1999 (JP) .......................................... 11-008512

(51) Int. Cl.⁷ ................................................. G11B 7/00
(52) U.S. Cl. .............................. 369/112.26; 369/112.23; 359/708; 359/721
(58) Field of Search ....................... 369/112.23, 112.26; 359/708, 721

(56) References Cited

U.S. PATENT DOCUMENTS

| | | | |
|---|---|---|---|
| 4,864,228 A | * 9/1989 | Richardson | 324/158 |
| 4,979,807 A | * 12/1990 | Matsuoka | 350/432 |
| 5,148,322 A | * 9/1992 | Aoyama et al. | 359/708 |
| 5,703,862 A | * 12/1997 | Lee et al. | 369/112 |
| 5,883,747 A | * 3/1999 | Yamazaki et al. | 359/719 |
| 6,088,322 A | * 7/2000 | Broome et al. | 369/112 |
| 6,118,749 A | * 9/2000 | Arai et al. | 369/112 |
| 6,124,988 A | * 9/2000 | Yanagisawa et al. | 359/719 |
| 6,198,714 B1 | * 3/2001 | Yoo et al. | 369/112 |
| 6,272,099 B1 | * 8/2001 | Mizuno et al. | 369/112.26 |
| 6,285,646 B1 | * 9/2001 | Yoo et al. | 369/112.26 |

FOREIGN PATENT DOCUMENTS

| | | |
|---|---|---|
| EP | 0 818 781 A2 | 1/1998 |
| EP | 0 859 356 A2 | 8/1998 |
| EP | 0 874 359 A2 | 10/1998 |
| EP | 0 921 521 A2 | 6/1999 |

OTHER PUBLICATIONS

Japanese Abstract No. 07057271, dated Mar. 3, 1995.

* cited by examiner

*Primary Examiner*—Doris H. To
*Assistant Examiner*—Gautam R. Patel
(74) *Attorney, Agent, or Firm*—Sughrue Mion, PLLC

(57) ABSTRACT

An aspherical objective lens and its manufacturing method are disclosed which allows for forming an optical spot with fewer side lobes on optical discs having a continuous lens plane and substrates different in thickness. The aspherical objective lens is characterized by converging first and second beams of light of first and second wavelengths individually on a first optical disc having a first substrate thickness and on a second optical disc having a second substrate thickness greater than the first substrate thickness at approximately a valid first numerical aperture and a second numerical aperture smaller than the first numerical aperture, respectively. A difference between average values of variations in wavefront aberration corresponding to an inner circumference portion and outer circumference portion, when the first beam of light converges on the first optical disk of the first substrate thickness, is approximately equal to one wavelength of a beam of light of the first wavelength.

12 Claims, 12 Drawing Sheets

A : THE RELATIONSHIP BETWEEN THE NUMERICAL APERTURE AND THE ABERRATION WHEN A CD IS REPRODUCED BY MEANS OF AN ASPHERICAL OBJECTIVE LENS OF THE PRESENT INVENTION

B : THE RELATIONSHIP BETWEEN THE NUMERICAL APERTURE AND THE ABERRATION WHEN A CD IS REPRODUCED BY MEANS OF A DVD-DEDICATED OBJECTIVE LENS

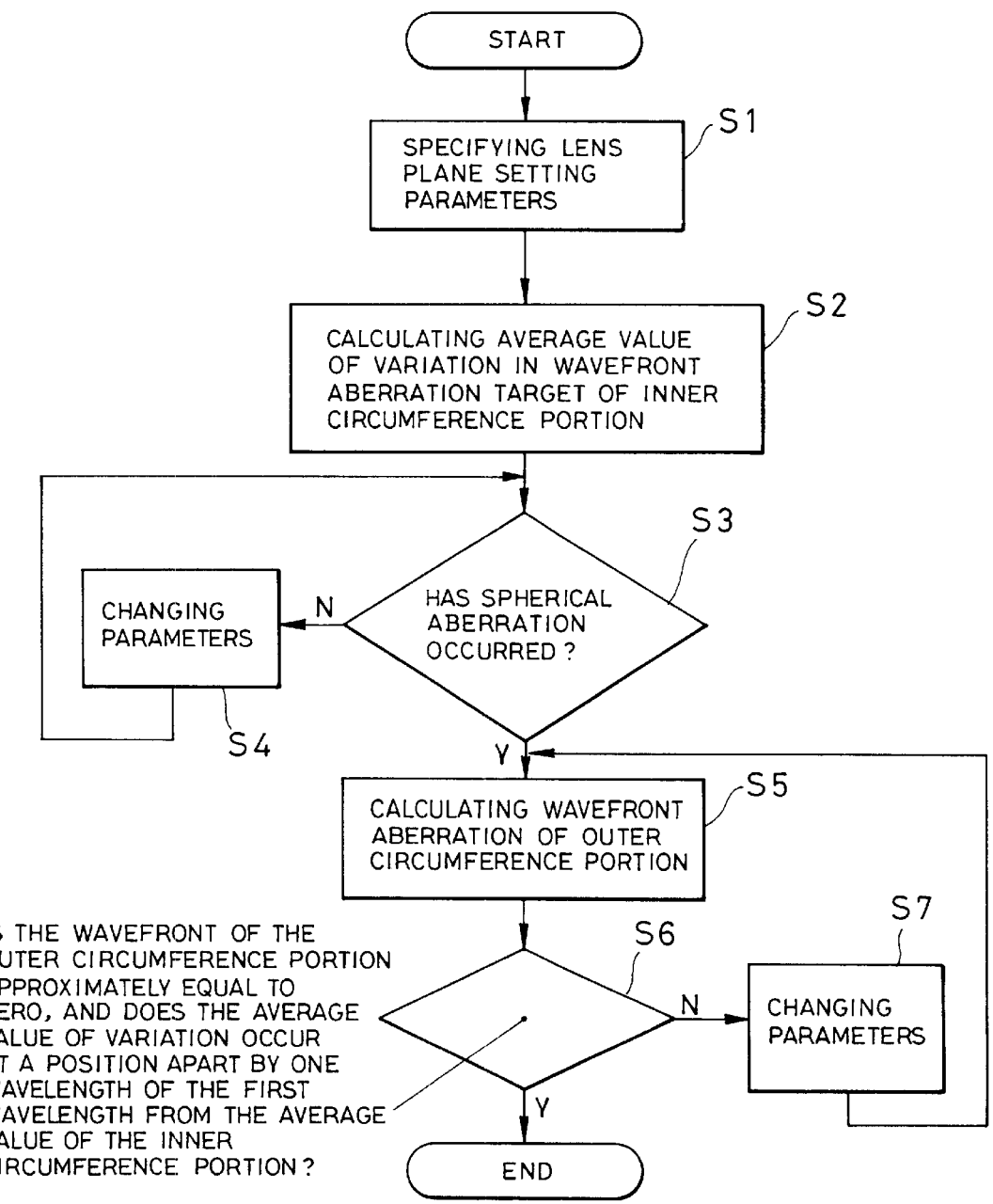

WAVE-OPTICAL SPOT SHAPE ON A THIN OPTICAL DISC SUBSTRATE (DVD)
(NORMALIZED BY THE CENTER INTENSITY)

WAVE-OPTICAL SPOT SHAPE ON A THICK OPTICAL DISC SUBSTRATE (CD)
(NORMALIZED BY THE CENTER INTENSITY)

WAVEFRONT ABERRATION SHAPE AS A DESIGN TARGET
FOR A LENS OF EMBODIMENT 1

WAVEFRONT ABERRATION OF AN OBJECTIVE LENS OF EMBODIMENT 1 ON A DVD DISC

WAVE-OPTICAL SPOT SHAPE OF AN OBJECTIVE LENS OF EMBODIMENT 1 ON A DVD DISC

WAVEFRONT ABERRATION OF AN OBJECTIVE LENS OF EMBODIMENT 1 ON A CD DISC

WAVE-OPTICAL SPOT SHAPE OF AN OBJECTIVE LENS OF EMBODIMENT 1 ON A CD DISC

WAVEFRONT ABERRATION OF AN OBJECTIVE LENS OF EMBODIMENT 2 ON A DVD DISC

WAVE-OPTICAL SPOT SHAPE OF AN OBJECTIVE LENS OF EMBODIMENT 2 ON A DVD DISC

WAVEFRONT ABERRATION OF AN OBJECTIVE LENS OF EMBODIMENT 2 ON A CD DISC

WAVE-OPTICAL SPOT SHAPE OF AN OBJECTIVE LENS OF EMBODIMENT 2 ON A CD DISC

A : THE RELATIONSHIP BETWEEN THE NUMERICAL APERTURE AND THE ABERRATION WHEN A CD IS REPRODUCED BY MEANS OF AN ASPHERICAL OBJECTIVE LENS OF THE PRESENT INVENTION

B : THE RELATIONSHIP BETWEEN THE NUMERICAL APERTURE AND THE ABERRATION WHEN A CD IS REPRODUCED BY MEANS OF A DVD-DEDICATED OBJECTIVE LENS

ASPHERICAL OBJECTIVE LENS FOR READING INFORMATION FROM OPTICAL DISKS OF DIFFERENT THICKNESS AND MANUFACTURING METHOD THEREFOR

BACKGROUND OF THE INVENTION

1. Field of the Invention

The present invention relates to an aspherical objective lens for use in an optical system of an optical pickup of an optical recording and reproducing apparatus.

2. Description of Related Art

Among optical recording and reproducing apparatuses, available is an optical disc player for reading information recorded on optical discs such as optical recording medium, that is, LD (laser disc), CD (compact disc), CD-R (compact disc recordable), and DVD (digital video disc). Also available is a compatible disc player for reading information from a plurality of optical discs.

The optical pickup used for these is provided with an optical system that irradiates an optical disc with an optical beam to read the return beam from the optical disk. This optical disc system is designed to different specifications such as numerical aperture NA, the thickness of an optical disc substrate, and an optimum optical wavelength for reading. Therefore, it is necessary to correct differences at least in the aforementioned numerical aperture NA and thickness in order to implement an optical pickup for an LD/CD/DVD compatible player. The optical pickup schemes of the compatible player are explained below in (1) through (3).

(1) A Scheme for Switching Between Objective Lenses Depending on the Thickness of an Optical Disc Substrate This scheme requires at least two objective lenses for one pickup and a mechanism for switching between these lenses, thereby hindering a reduction in size and cost of the pickup.

(2) A Scheme for Employing a Hologram

This scheme allows for reproducing optical discs, different in thickness, using zero-order and first-order diffracted beams of light of the hologram. However, one diffracted beam of light always occurs even when the other diffracted beam of light is being reproduced and a diffracted beam of light other than the aforementioned beams occurs in practice even in a small amount, thereby providing a low efficiency of the optical power. In addition, the addition of a hologram increases the number of parts involved, thus hindering a reduction in the size and cost of the pickup. Moreover, a hologram can be formed on a plane of an objective lens with the hologram and the objective lens integrated to provide a reduced size and low cost, however, there is no change in the fact that an unnecessary beam of light occurs even when the hologram is integrated. Moreover, such objective lenses provide poor mass productivity compared with typical aspherical objective lenses.

(3) A Scheme for Employing an Objective Lens Having Three Orbicular Zones

This scheme allows for using the inner and outer circumference portions of an orbicular zone to reproduce an optical disc of a thin substrate, while using the inner and middle circumference portions to reproduce an optical disc of a thick substrate.

The use of such an objective lens allows one objective lens to record and reproduce optical discs having different specifications, for example, the thickness of the substrate, without adding, in particular, additional parts to the optical system. However, this would provide the objective lens with a step, thus making the shape of the lens discontinuous. This would therefore require workmanship of a higher level than that for a conventional aspherical lens, providing poor mass productivity and increasing the cost of the pickup.

Objective lenses for use in the pickup of an optical disc are designed to the thickness of the optical disc to be reproduced. Reproducing an optical disc having a thickness different from the thickness for which the disc has been designed would not allow for forming an adequate spot on the optical disc due to spherical aberration. Consequently, an adequate reproducing performance cannot be obtained. The amount of spherical aberration caused by a difference in thickness between the optical disc and the designed value therefor is proportional to the fourth power of the numerical aperture of the objective lens. Therefore, decreasing the numerical aperture by adding an aperture to the optical system allows for reducing the spherical aberration. On the other hand, the diameter of a spot on the optical disc is inversely proportional to the numerical aperture of the objective lens. Decreasing the numerical aperture can reduce the aberration, but also causes the diameter of the spot to increase.

Therefore, no excessive decrease in the numerical aperture is allowed. Specifications have been established as in Table 1 for DVD, CD, and CD-R, which are currently in vogue for optical discs.

TABLE 1

|  | DVD | CD | CD-R |
|---|---|---|---|
| Reproducing wavelength | 650 nm | 650/780 nm | 780 nm |
| Substrate thickness | 0.6 mm | 1.2 mm | 1.2 mm |
| Numerical aperture | 0.6 | 0.375/0.45 | 0.45 |

As shown in the table, CD and CD-R have a smaller numerical aperture than that of DVD, and thus it is conceivable to limit the aperture so that the objective lens of DVD has a numerical aperture of 0.45. However, practically as shown by curve B in FIG. 1, a numerical aperture of 0.45 set by the aperture to reproduce a CD (particularly, CD-R) by the objective lens for the DVD would not provide a good reproducing performance since the aberration is 0.07λ or greater, that is, greater than Marechal's limit. Actual calculation of the diameter of the spot based on the wavefront aberration teaches, as shown in FIG. 2, that a side lobe increases significantly compared with the case of a CD-dedicated objective lens.

Prior art scheme (3) is available as the most simplified method for solving such problems, however, such a lens as has the shape of special orbicular recessed portions provides inefficient mass productivity.

OBJECTS AND SUMMARY OF THE INVENTION

In view of the aforementioned problems, the object of the present invention is to provide an aspherical objective lens having performance equivalent to the aforementioned scheme (3) without forming orbicular recessed portions thereon and making the shape of the objective lens discontinuous.

The aspherical objective lens, according to the present invention, is an objective lens capable of converging first and second beams of light of first and second wavelengths individually on a first optical disc having a first substrate thickness and on a second optical disc having a second substrate thickness greater than the first substrate thickness at approximately a valid first numerical aperture and a second numerical aperture less than the first numerical aperture, respectively; characterized in that a difference between the average values of variations in wavefront aberration corresponding to an inner circumference portion and an outer circumference portion, when said first beam of light converges on said first optical disc having said first substrate thickness, is approximately equal to one wavelength of a beam of light of said first wavelength.

The aspherical objective lens, according to the present invention, is characterized in that wavefront aberration corresponding to numerical apertures up to a middle circumference portion between said inner and outer circumference portions is equal to or less than Marechal's limit when said second beam of light is converged on said substrate of the second thickness.

The method for manufacturing the objective lens, according to the present invention, is a method for manufacturing an aspherical objective lens capable of converging first and second beams of light of first and second wavelengths individually on a first optical disc having a first substrate thickness and on a second optical disc having a second substrate thickness greater than the first substrate thickness at approximately a valid first numerical aperture and a second numerical aperture less than the first numerical aperture, respectively, said method comprising the steps of setting parameters for specifying a lens plane of a target lens, having an inner circumference portion around an optical axis, which allows a beam of light of said first wavelength to converge almost with no aberration on a transparent substrate having an assumed substrate of a thickness between said first substrate thickness and the second substrate thickness at a third target numerical aperture approximately equal to or less than said second numerical aperture;

calculating an inner circumference average value of variations in a target wavefront aberration corresponding to the inner circumference portion of said target lens in accordance with said parameters when a beam of light of said first wavelength is allowed for converging on an optimal image plane on said first optical disc; and varying and updating said parameters so that the outer circumference portion of said target lens converges almost with no aberration on the transparent substrate having said substrate of the first thickness, and an average value of variations in the wavefront aberration thereof occurs at a position apart by one wavelength of a beam of light of said first wavelength from said inner circumference average value.

The aspherical objective lens and its manufacturing method are characterized in that said second wavelength is longer than said first wavelength.

According to the present invention, aberration is equal to or less than 0.07λ rms for both optical discs of a thin substrate thickness, that is, the first substrate thickness and of a thick substrate thickness, that is, the second substrate thickness in the middle circumference portion. The aberration is corrected on the thin substrate in the outer circumference portion by a phase difference of approximately one wavelength relative to the inner circumference portion. Wavefronts of the inner and outer circumference portions are thus allowed for being joined smoothly with no discontinuity in the middle circumference portion. This allows the objective lens to take a continuous shape, thereby providing high-mass productive of objective lenses for use in compatible disc players.

BRIEF DESCRIPTION OF THE DRAWINGS

FIG. 4 is a flow diagram showing a method for manufacturing an aspherical objective lens according to the present invention.

DETAILED DESCRIPTION OF THE PREFERRED EMBODIMENTS

The embodiments of an aspherical objective lens and its manufacturing method for DVD/CD/CD-R compatible disc players are explained below with reference to the drawings. For example, a thin optical disc substrate (DVD optical disc) and a thick optical disc substrate (CD optical disc) will be explained.

Figure 1:
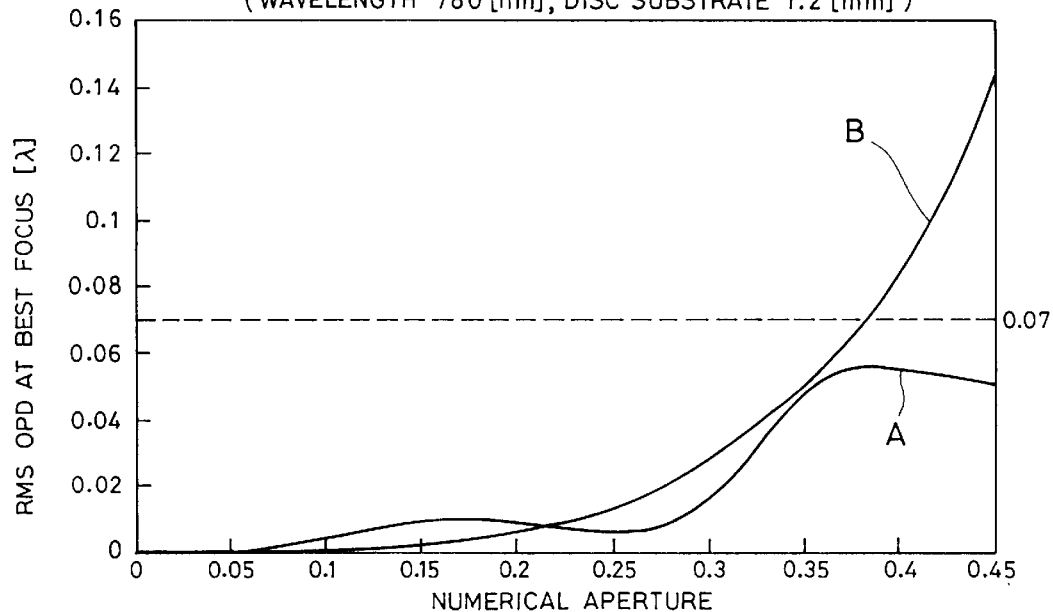
FIG. 1 is a graph showing the relationship between the numerical aperture and aberration for reproducing a CD by a DVD-dedicated objective lens, and the relationship between the numerical aperture and aberration for reproducing a CD by an aspherical objective lens of the present invention.
Figure 2:
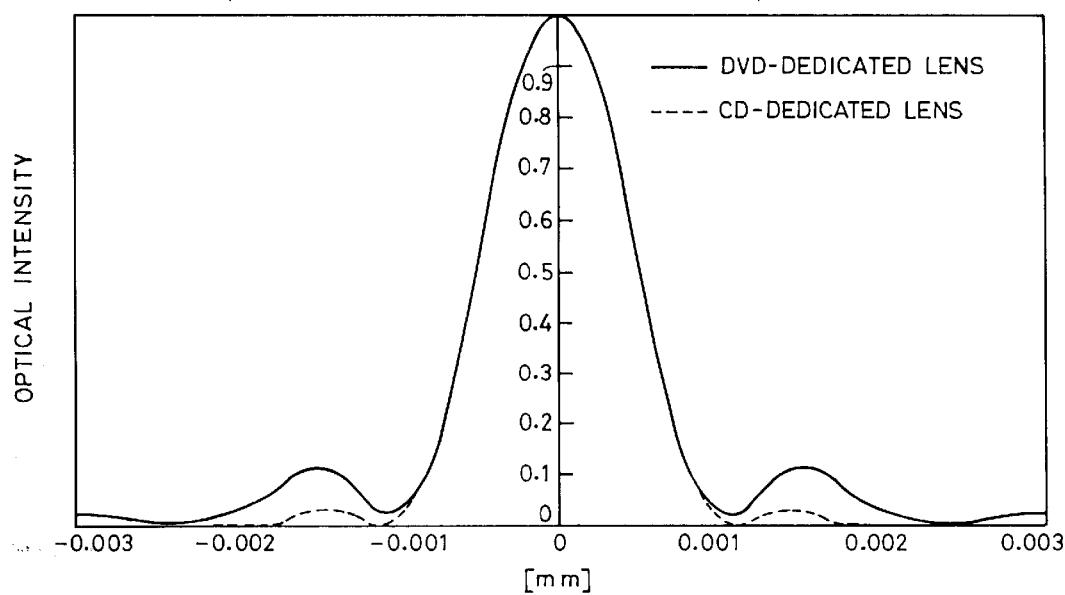
FIG. 2 is a graph showing the wave-optical spot shape intensity on a thick optical disc substrate (CD) normalized by the center intensity.
Figure 3A:
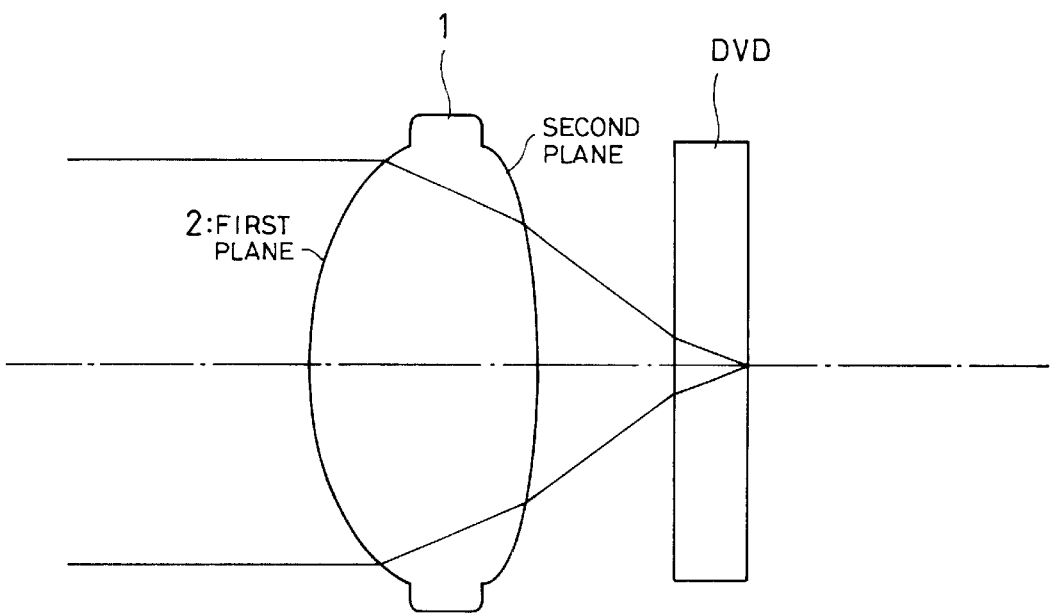
FIG. 3A and FIG. 3B are schematic cross-sectional views showing the objective lens of the present invention.
Figure 3B:
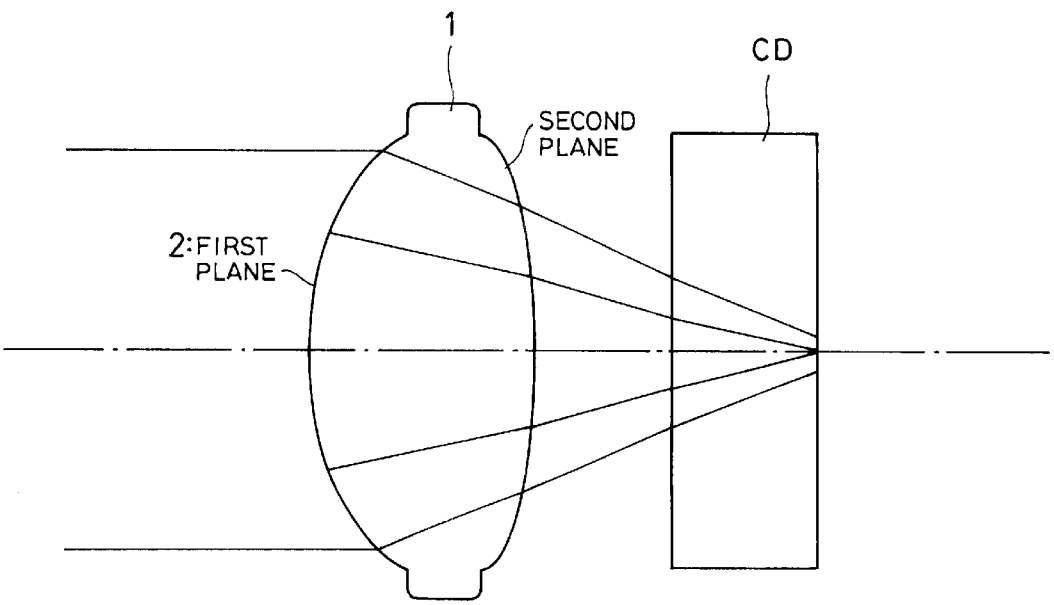
Figure 6:
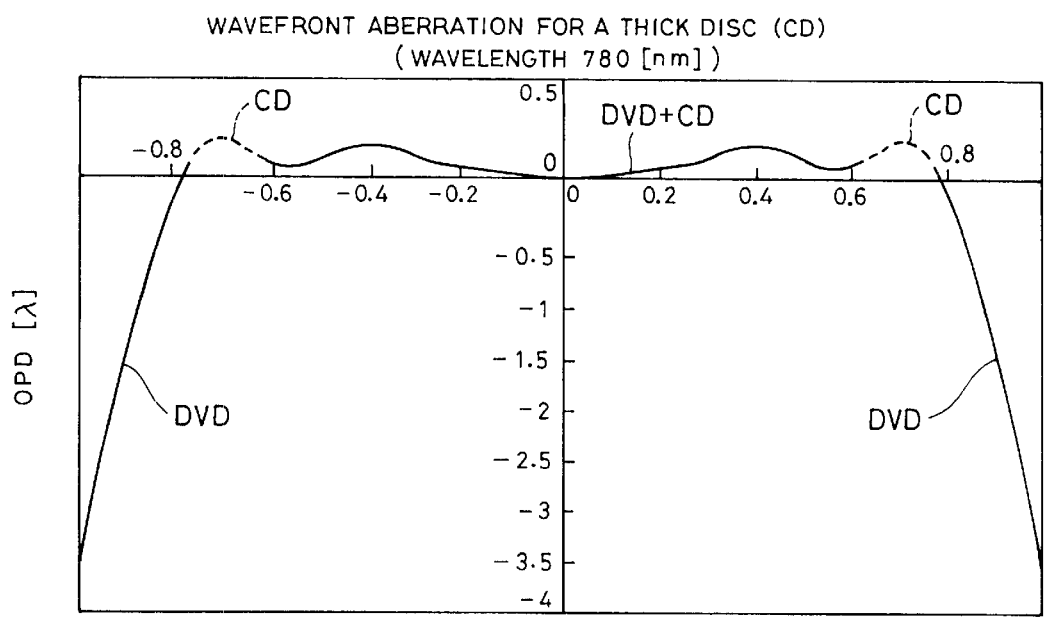
FIG. 6 is a graph of an optical path difference showing the wavefront aberration of an objective lens of the present invention, through which a beam of light having a second wavelength of 780 nm used for a thick optical disc substrate (CD) is transmitted, at a normalized radius position from the optical axis.

As shown in FIG. 3(A), the aspherical objective lens 1 has a first plane 2. The first plane 2 allows a beam of light of a first wavelength of, for example, 650 nm to converge to a first disc, for example, a DVD having a first substrate thickness, for example, of 0.6 mm at an effective numerical aperture, for example, a first numerical aperture of about 0.6. As shown in FIG. 3B, the first plane 2 also allows a beam of light of a second wavelength to converge to a second disc, for example, a CD of a second substrate thickness of, for example, 1.2 mm at an effective second numerical aperture of, for example, about 0.45. In this example, the second wavelength is longer than the first wavelength, for example, 780 nm; the second substrate thickness being greater than the first substrate thickness; and the second numerical aperture being less than the first numerical aperture. The aspherical objective lens has a wavefront aberration such that a difference between the average values of variations in wavefront aberrations is approximately equal to one wavelength of the light of the first wavelength of 650 nm . Here, the wavefront aberrations correspond to the inner and outer circumference portions at the time of convergence of the first optical beam of a wavelength of 650 nm to the first optical disc. Furthermore, the aspherical objective lens allows said middle portion to smoothly join together the wavefronts of beams of light passing through the inner and outer circumference portions of the lens plane. As shown in FIG. 6, the spherical aberration decreases significantly which corresponds to the middle circumference portion of a lens plane for the second disc, for example, a region of approximately a numerical aperture of 0.45. Moreover, the wavefront aberration corresponding to the second numerical aperture is limited below Marechal's limit. This allows for providing smooth joining without discontinuity at the middle circumference portion between the inner and outer circumference portions of the lens plane.

Typically, aspherical objective lenses for optical discs are designed so that said lens has a predetermined focal length, and a sufficiently reduced and optimized aberration over a whole lens plane, by varying the radius of curvature and aspherical parameters and the like using a computer. As opposed to this, the automatic design, according to the present invention, employs the waveform of wavefront aberration as a target for optimized design.

FIG. 4 is an explanatory flow diagram showing a method for manufacturing an aspherical objective lens according to the present invention.

As shown in FIG. 4, assuming a target lens, aspherical parameters are set which specify the lens plane of the target lens, having an inner circumference portion around the optical axis, which allows a beam of light of a first wavelength to converge almost with no aberration on a transparent substrate at a third target numerical aperture. Here, the first wavelength is, for example, 650 nm; the transparent substrate has a thickness between those of the first and second substrates, for example, between 0.6 to 1.2 mm; and the third target numerical aperture is equal to or less than said second numerical aperture, for example, 0.45 (Step S1).

In accordance with these parameters, the inner circumference average value of variations in target wavefront aberration is calculated corresponding to the inner circumference portion of the target lens when a beam of the first wavelength is focused on an optimal image plane on a first optical disc having a first thickness of 0.6 mm (Step S2). A design is carried out to produce almost no aberration in the inner circumference portion, but to produce spherical aberration in the wavefront aberration for a DVD. As shown in the figure, in Step S3, it is detected whether spherical aberration occurs. If no spherical aberration has occurred, then the parameters are changed (Step S4) and the process returns to Step S2.

Subsequently, the wavefront aberration occurring on the outer circumference portion of the target lens is calculated (Step S5). Then, it is detected whether the aberration is almost zero and the average value of variations in wavefront aberration occurs at a position apart from the inner circumference average value of the wavefront aberration by approximately one wavelength of a beam of the first wavelength (Step S6). If the aforementioned conditions are not satisfied, the parameters are varied and updated (Step S7), and then the process returns to Step S5. Wavefront aberration is corrected at the outer circumference portion for the first optical disc of the first substrate thickness of 0.6 mm with a phase difference of approximately one wavelength relative to the inner circumference portion by carrying out Steps S1 through S7. Therefore, a clear optical spot can be formed on a thin substrate such as a DVD.

Figure 5:
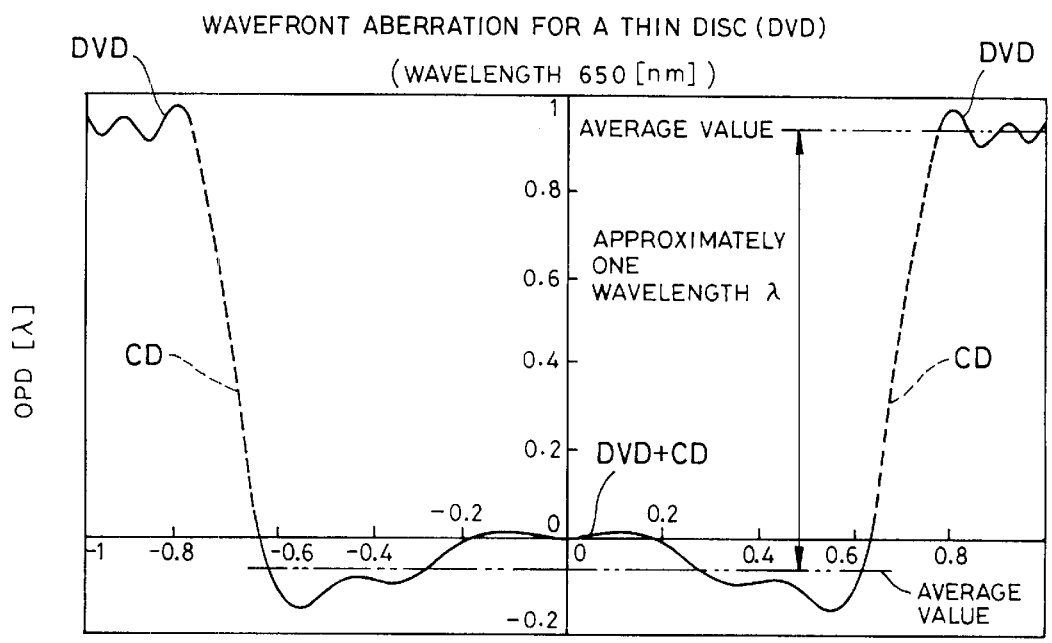
FIG. 5 is a graph of an optical path difference showing the wavefront aberration of an objective lens of the present invention, through which a beam of light having a first wavelength of 650 nm used for a thin optical disc substrate (DVD) is transmitted, at a normalized radius position from the optical axis.

As shown in FIG. 5, when the shape of the aspherical objective lens is designed, the wavefront aberration shape of the lens is corrected as follows. In the inner circumference portion, the wavefront aberration shape is corrected so that the aberration is equal to or less than 0.07λ in RMS value for both a thin optical disc substrate and a thick optical disc substrate. In the outer circumference portion, the wavefront aberration is corrected so that spherical aberration becomes smaller for a thin optical disc substrate and the phase difference between the inner circumference portion and the outer circumference portion is set to one wavelength. In the middle circumference portion, a beam of light that has passed through the inner and outer circumference portions is used for reproducing a thin substrate optical disc to join the wavefronts of the inner and outer circumference portions. The beam of light passing through the middle circumference portion is significantly defocused and thus affects the reproducing characteristics less.

Furthermore, as shown in FIG. 6, when the aspherical objective lens reproduces an optical disc of a thick substrate, the wavefront aberration for the CD optical disc does not allow the outer circumference portion to concentrate beams of light onto the optical disc due to the aberration. However, the inner and outer circumference portions have aberration equal to or less than 0.07λ rms in RMS value, which is Marechal's limit, allowing a spot necessary for reproducing the CD to be viewed. Like these DVD and CD, when the numerical aperture required for reproducing a thick substrate optical disc is less than the numerical aperture required for reproducing a thin optical disc, the numerical aperture of the whole lens plane for a CD decreases substantially. However, the numerical aperture up to the smooth middle circumference portion becomes available, whereby a CD can be reproduced without any trouble. When a CD is reproduced by means of the aspherical objective lens, the reproducing characteristics are less affected since the beam of light passing through the outer circumference portion of the objective lens is significantly defocused. Incidentally, values of the numerical apertures of the inner and outer circumference portions that provide a good spot shape are used.

Figure 7:
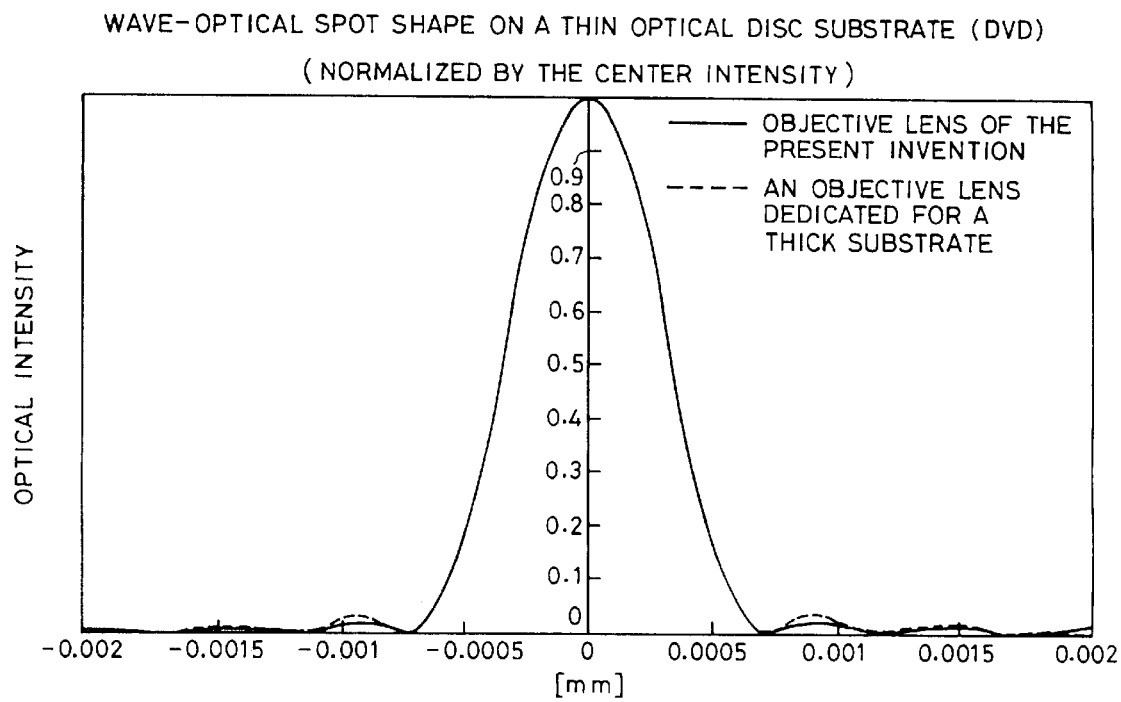
FIG. 7 is a graph showing the wave-optical spot shape intensity, normalized by the center intensity, according to the objective lens of the present invention on a thin optical disc substrate (DVD).
Figure 8:
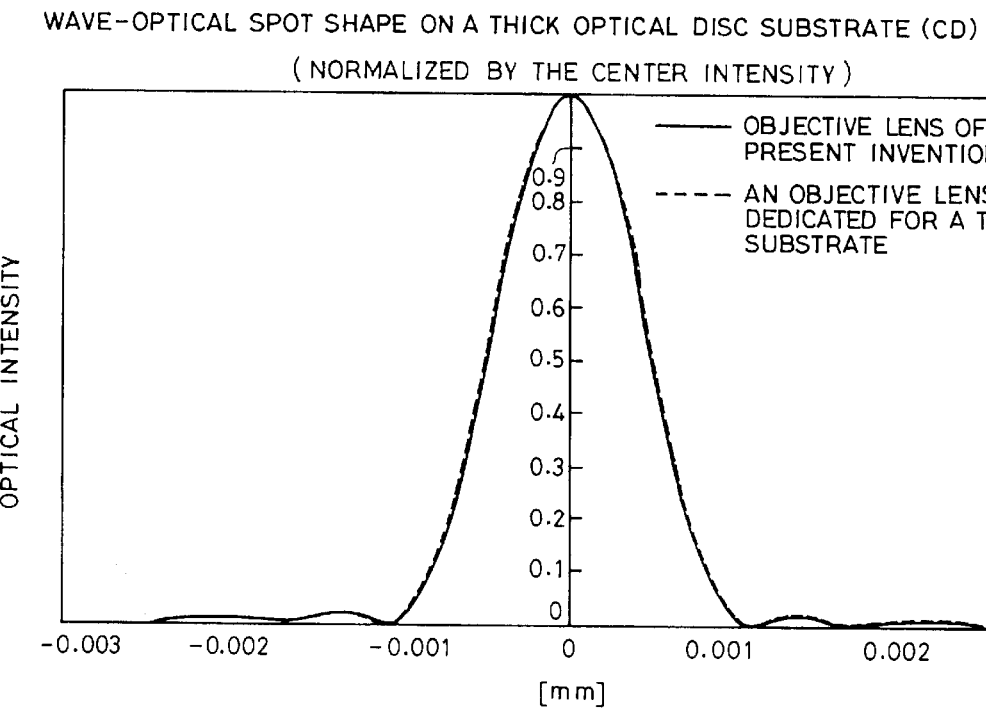
FIG. 8 is a graph showing the wave-optical spot shape intensity, normalized by the center intensity, according to the objective lens of the present invention on a thick optical disc substrate (CD).

FIG. 7 and FIG. 8 show the results of simulation of wave-optical spot shapes using the aspherical objective lens. As can be seen from the figures, it is found that a good spot shape is available which is equivalent to that provided by conventional purpose-built objective lenses, respectively.

Figure 9:
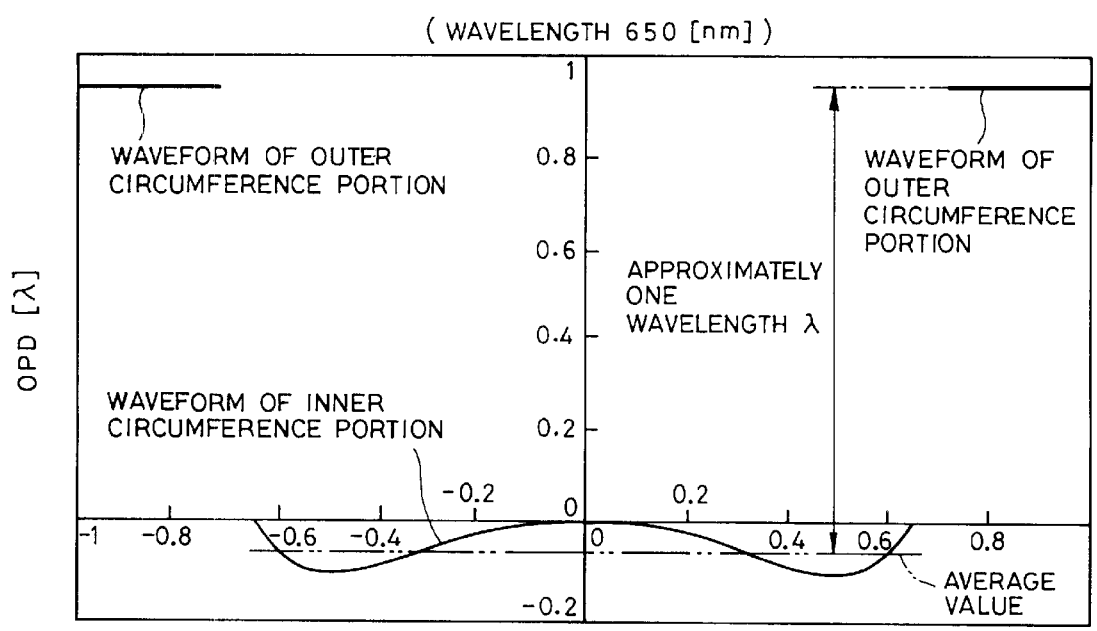
FIG. 9 is a graph showing the shape of a wavefront aberration as a target for designing an objective lens, according to an embodiment of the present invention, at a normalized radius position from an optical axis.

In automatic design, the waveforms as shown in FIG. 9 were used for a beam of light of the first wavelength, for example, 650 nm as a target wavefront aberration for optimizing the lens.

In FIG. 9, the target wavefront aberration of the inner circumference portion is an optimal wavefront shape of a target lens for an optical disc 0.6 mm thick that is optimized to an assumed substrate of a thickness of 0.8 mm with the target numerical apertures of 0.41 of the inner circumference portion.

The waveform of the outer circumference portion is a wavefront shape in a state of no spherical aberration for an optical disc 0.6 mm thick at a position apart by approximately one wavelength from the average value of the aberration of the inner circumference portion. This is the target wavefront aberration shape of the outer circumference portion, being the average value of variations in wavefront aberration corresponding to the outer circumference portion of the lens obtained.

As for the middle circumference portion, a target numerical aperture of 0.457 was employed. Such a target value may be used that joins the inner and outer circumference portions smoothly. However, when target values of the inner and outer circumference portions are given to implement one aspherical shape, the middle circumference portion becomes such a wavefront as to smoothly join the inner and outer circumference portions by itself. Therefore, no target value needs to be set in the middle circumference portion.

Table 2 shows the data of the aspherical objective lens that has been designed and manufactured.

TABLE 2

| Lens plane | Radius of curvature | Thickness | Refractive index |
|---|---|---|---|
| First plane | 2.192000w | 2.600000 (Lens) | 1.586422 |
| Second plane | −9.276000w | 1.480163 (Plane spacing) 0.600000 (Substrate) | 1.000000 1.580000 |

| Aspherical plane Coefficient | First plane | Second plane |
|---|---|---|
| CC | −5.420884e−01 | −3.000000e+01 |
| A4 | −6.719957e−03 | 1.303000e−02 |
| A6 | 2.403071e−02 | −3.292200e−03 |
| A8 | −3.532134e−02 | 4.257400e−04 |
| A10 | 2.786607e−02 | −2.339100e−05 |
| A12 | −1.241595e−02 | 0.000000e+00 |
| A14 | 3.134341e−03 | 0.000000e+00 |
| A16 | −4.186011e−04 | 0.000000e+00 |
| A18 | 2.299768e−05 | 0.000000e+00 |

Figure 10:
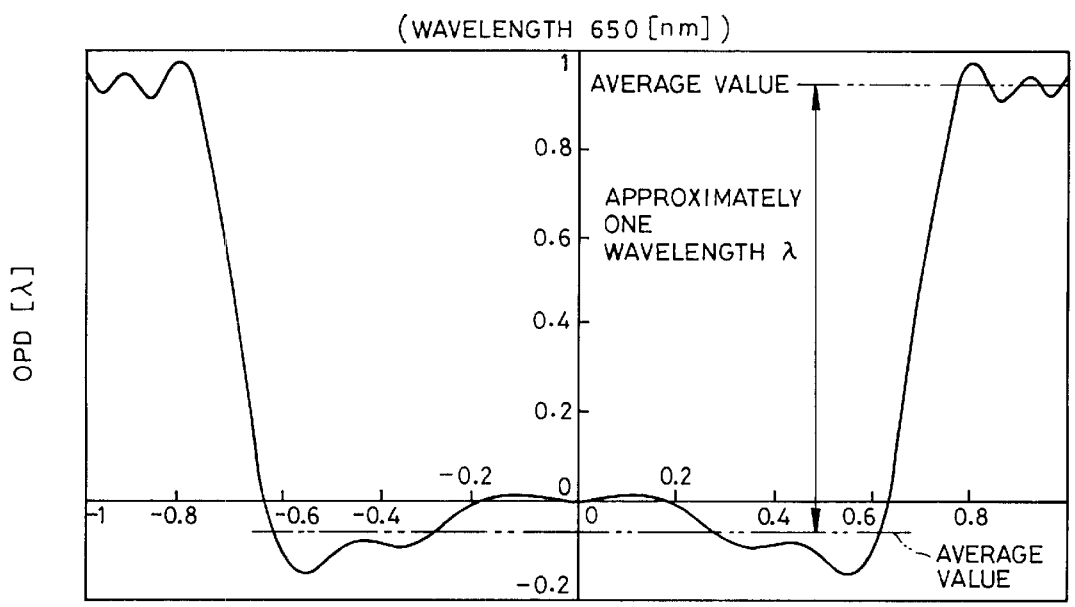
FIG. 10 is a graph showing the shape of a wavefront aberration, on a DVD, of an objective lens according to an embodiment of the present invention at a normalized radius position from an optical axis.

However, the shape of the lens is given by the following equation.

$$z = \frac{cv * r^2}{1 + \sqrt{1 - cv^2(cc+1)*r^2}} + \sum_i Ai * r^i \quad (1)$$

where z is a SAG of the lens, cv is a curvature on the optical axis, cc is a cone coefficient, r is a radius from the optical axis, Ai is a spherical coefficient of the $i^{th}$ order, and $r^i$ is the $i^{th}$ power of the radius from the optical axis. FIG. 10 is a graph showing the shape of the wavefront aberration of the objective lens obtained for a DVD (an optical disc of a thickness of 0.6 mm and light source wavelength of 650 nm).

Figure 11:
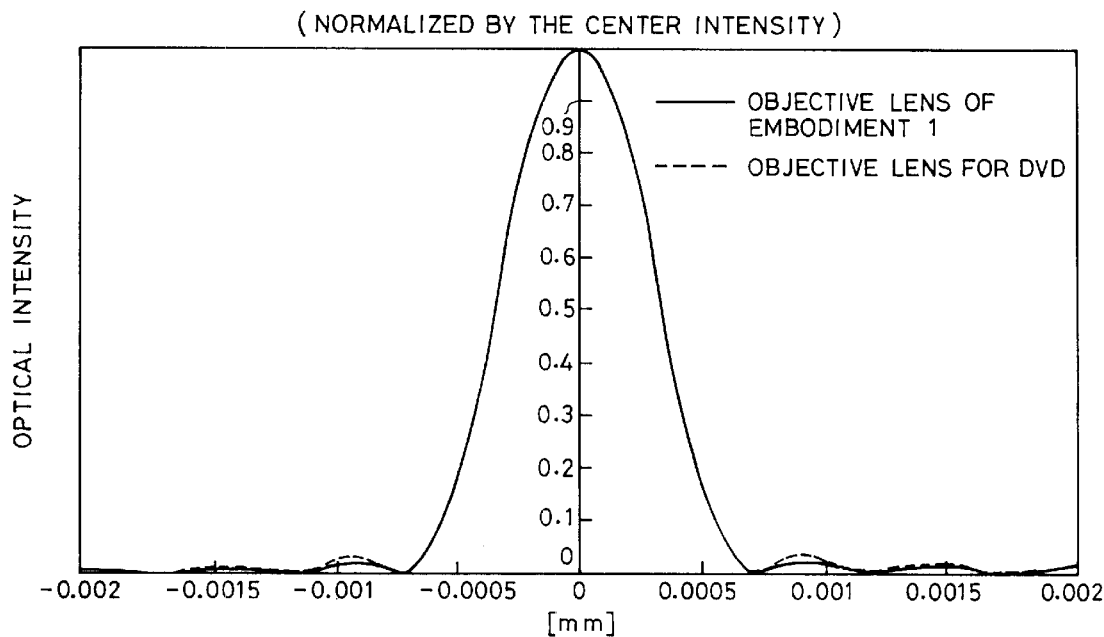
FIG. 11 is a graph showing the wave-optical spot shape intensity on a DVD, normalized by the center intensity, according to the objective lens having the wavefront aberration shown in FIG. 10.

FIG. 11 shows the results of calculation of wave-optical spot shapes on the DVD optical disc based on the wavefront aberration of the DVD. In FIG. 10, it is found that a good spot shape has been obtained.

Figure 12:
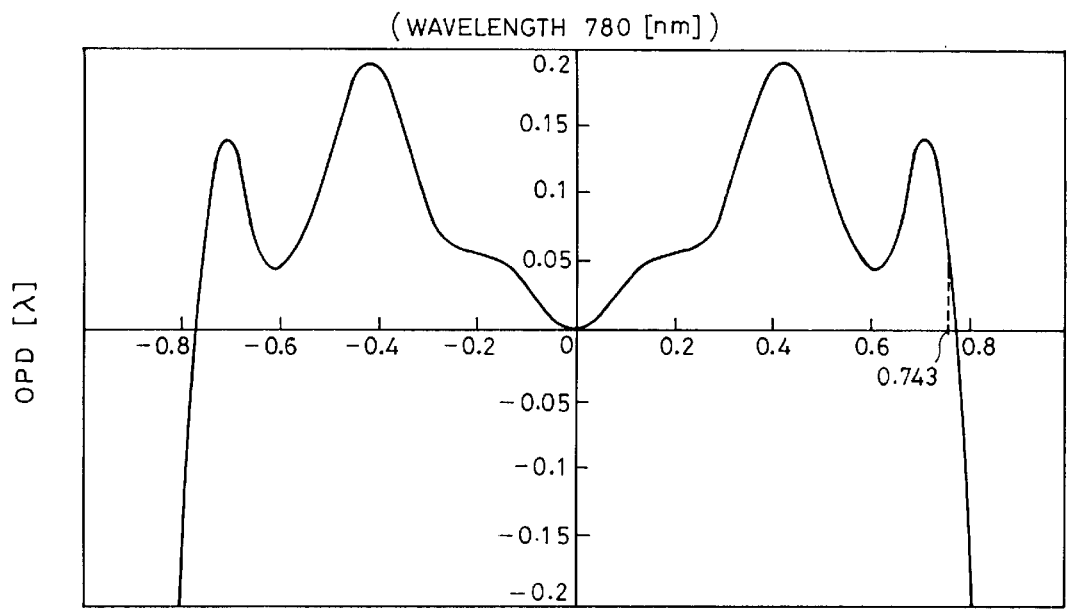
FIG. 12 is a graph showing the shape of a wavefront aberration, on a CD, of an objective lens according to an embodiment of the present invention at a normalized radius position from an optical axis.

Furthermore, FIG. 12 shows the shape of a wavefront aberration of the objective lens obtained for a CD (an optical disc of a thickness of 1.2 mm and a light source wavelength of 780 nm). The wavefront aberration of the numerical aperture up to 0.743 (corresponding to a numerical aperture of 0.452) on the horizontal axis of FIG. 12 is 0.05λ rms, maintained equal to or less than the Marechal's limit, 0.07λ. Incidentally, the outer circumference portion with a large numerical aperture has such a significantly large aberration as not to converge on the optical disc.

Figure 13:
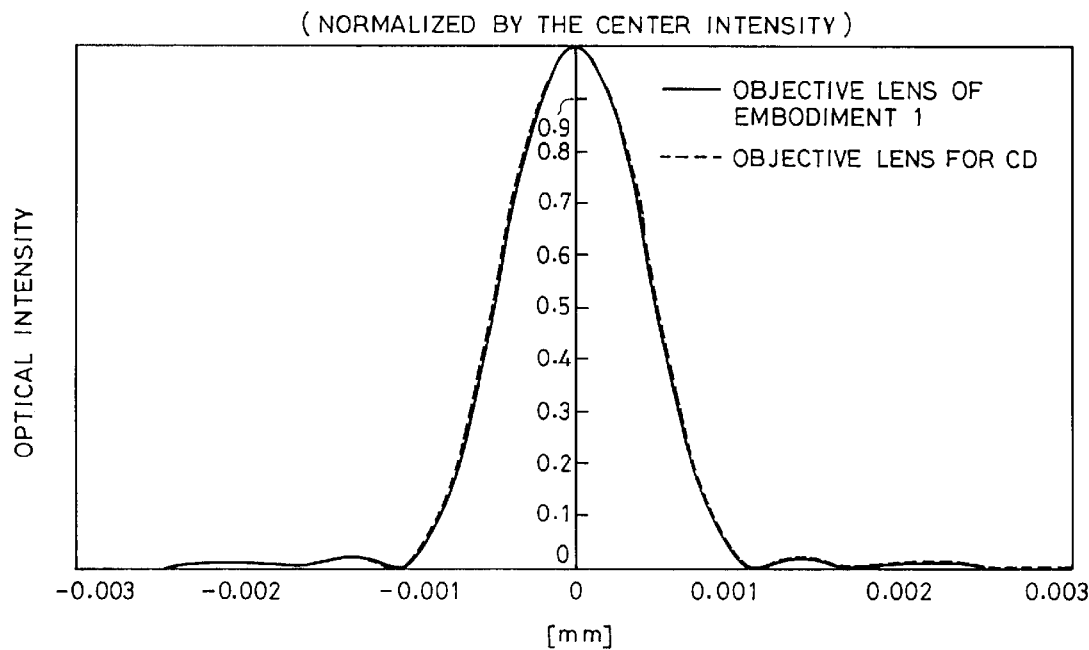
FIG. 13 is a graph showing the wave-optical spot shape intensity on a CD, normalized by the center intensity at a normalized position from the spot center, according to the objective lens having the wavefront aberration shown in FIG. 12.
Figure 14:
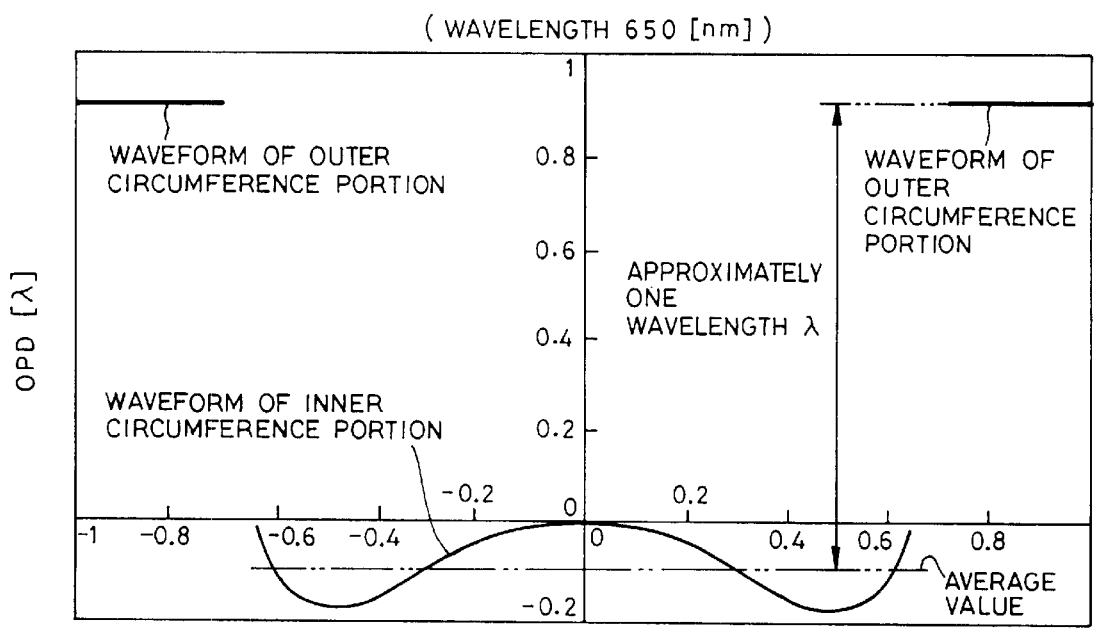
FIG. 14 is a graph showing the shape of a wavefront aberration as a target for designing an objective lens, according to another embodiment of the present invention, at a normalized radius position from an optical axis.

FIG. 13 shows the results of calculation of wave-optical spot shapes on the CD optical disc based on the wavefront aberration of the CD. In FIG. 14, it is found that a good spot shape has been obtained.

In the embodiment, the use of a beam of light having a wavelength, where the second wavelength is longer than the first wavelength, has been explained. However, this is not necessarily required and the second wavelength is equal to or greater than the first wavelength. That is, such a condition can also be employed in that a beam of light of a wavelength of 650 nm , which is the same wavelength as that for reproducing a DVD, is also used for reproducing a CD without considering the reproduction of a CD-R.

Accordingly, the reproduction of a CD by a beam of light of a wavelength of 650 nm using the lens, according to embodiment 1, is compared with the reproduction of a CD by a beam of light of a wavelength of 650 nm using a DVD-dedicated objective lens. This comparison is carried out to show that the present invention is valid even when a beam of light of a wavelength of 650 nm is used for reproducing a CD. In this case, since the spot size upon reproduction is proportional to λ/NA, a numerical aperture is approximately 0.375 when a beam of light of a reproducing wavelength of 650 nm is used.

Figure 19:
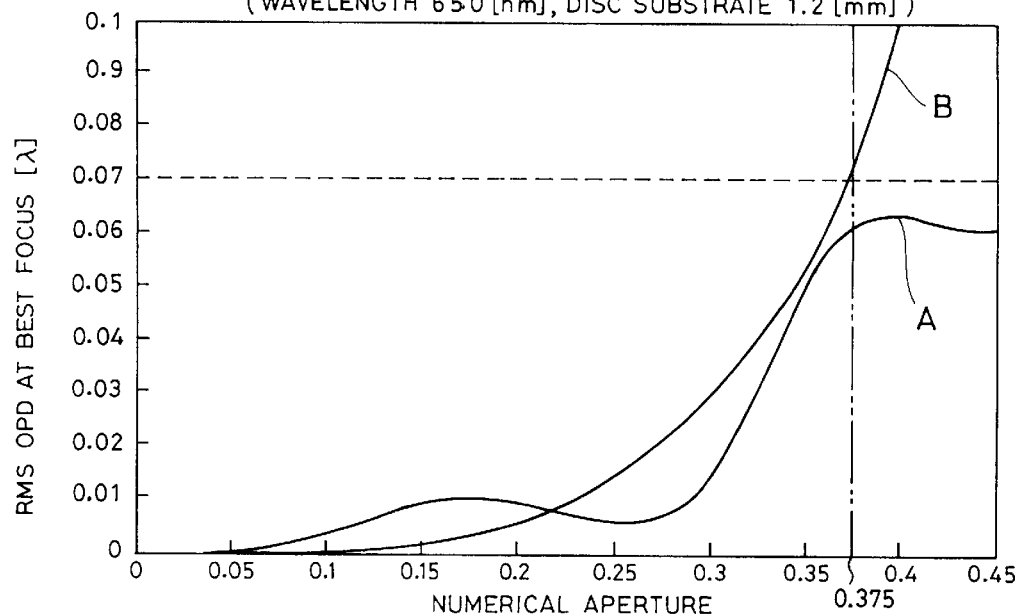
FIG. 19 is a graph showing the relationship between the numerical aperture and aberration for reproducing a CD by a DVD-dedicated objective lens, and the relationship between the numerical aperture and aberration for reproducing a CD by an aspherical objective lens of the present invention, using beams of light of a wavelength of 650 nm.

FIG. 19 shows the relationship between the numerical aperture and the optimal wavefront aberration when a beam of light of a wavelength of 650 nm is used for reproducing a CD. As can be seen from the figure, when a DVD-dedicated lens is used, the numerical aperture is equal to 0.375 and the aberration slightly exceeds Marechal's limit, 0.07λ, but is equal to or less than Marechal's limit in embodiment 1.

Figure 20:
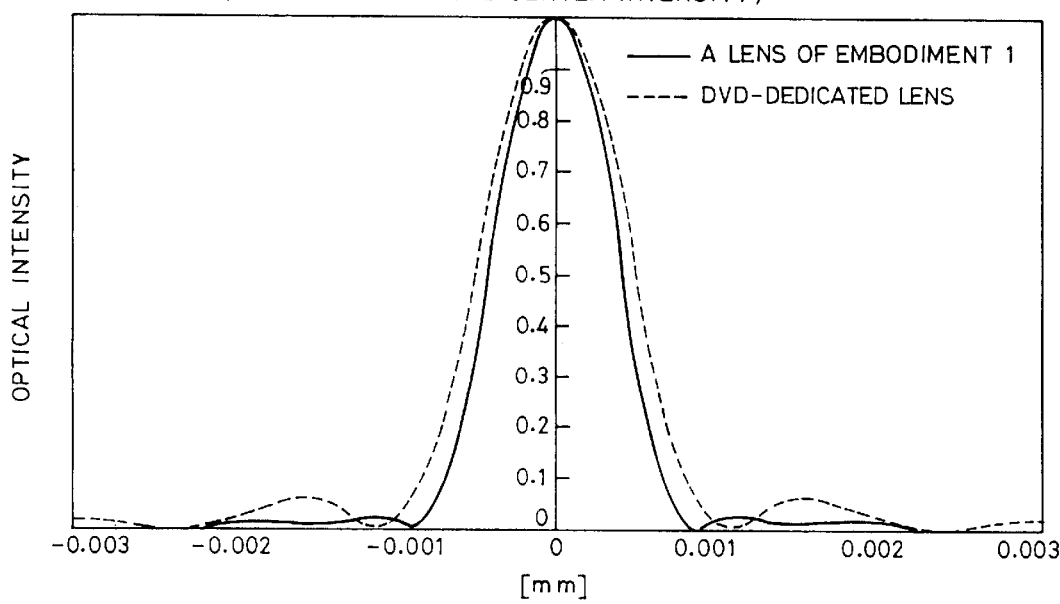
FIG. 20 is a graph showing the wave-optical spot shape intensity on a thick optical disc substrate (CD), normalized by the center intensity, according to the aspherical objective lens of the present invention using a beam of light of a wavelength of 650 nm.

Furthermore, as shown in FIG. 20, comparison of wave-optical spot shapes show that embodiment 1 provides a smaller spot and a smaller side lobe than those provided by the DVD-dedicated objective lens, thus providing improved reproducing characteristics. This is because the lens of embodiment 1 is maintained below Marechal's limit over higher numerical apertures.

As explained above, it is found that the lens of the present invention is valid even when the reproducing wavelength of the second disc is longer than that of the first disc, also being valid even when the first wavelength is equal to the second wavelength.

Embodiment 2 was implemented in the same manner as embodiment 1 except for an assumed substrate thickness of 0.9 mm.

FIG. 14 shows a target wavefront aberration shape to be used for embodiment 2.

Table 3 shows the data of the objective lens designed and manufactured, which is given by aforementioned equation 1.

TABLE 3

| Lens plane | Radius of curvature | Thickness | Refractive index |
|---|---|---|---|
| First plane | 2.192000w | 2.600000 (Lens) | 1.586422 |
| Second plane | −9.276000w | 1.477465 (Plane spacing) 0.600000 (Substrate) | 1.000000 1.580000 |

| Aspherical plane Coefficient | First plane | Second plane |
|---|---|---|
| CC | −5.346846e−01 | −3.000000e+01 |
| A4 | −6.073018e−03 | 1.303000e−02 |
| A6 | 2.204820e−02 | −3.292200e−03 |
| A8 | −3.256844e−02 | 4.257400e−04 |
| A10 | 2.583606e−02 | −2.339100e−05 |
| A12 | −1.157291e−02 | 0.000000e+00 |
| A14 | 2.935227e−03 | 0.000000e+00 |
| A16 | −3.935899e−04 | 0.000000e+00 |
| A18 | 2.169853e−05 | 0.000000e+00 |

Figure 15:
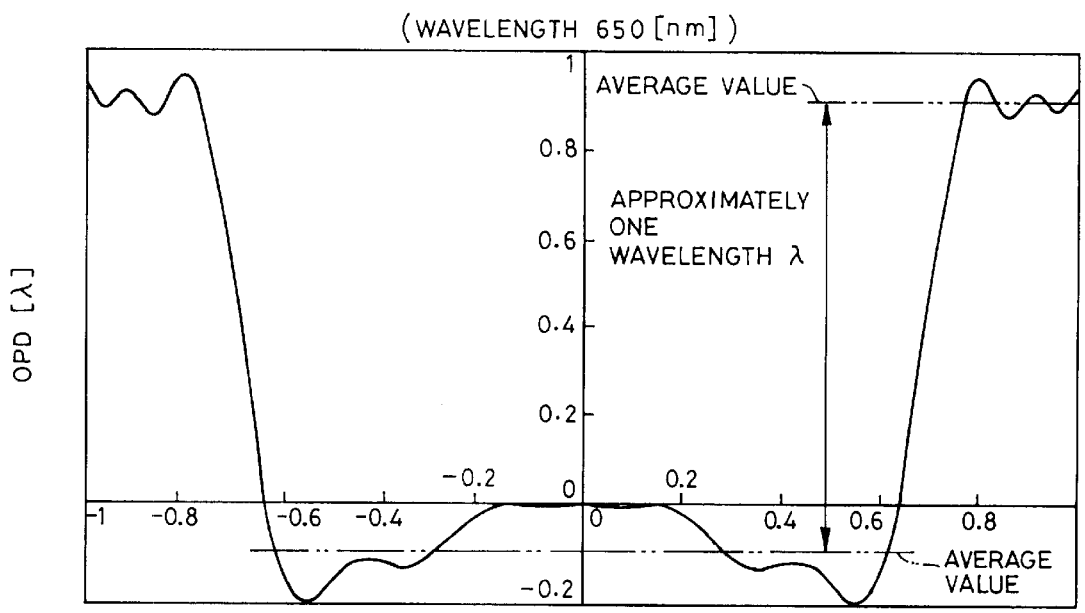
FIG. 15 is a graph showing the shape of a wavefront aberration, on a DVD, of an objective lens according to another embodiment of the present invention at a normalized radius position from an optical axis.

FIG. 15 is a graph showing the shape of the wavefront aberration of the objective lens obtained for a DVD.

Figure 16:
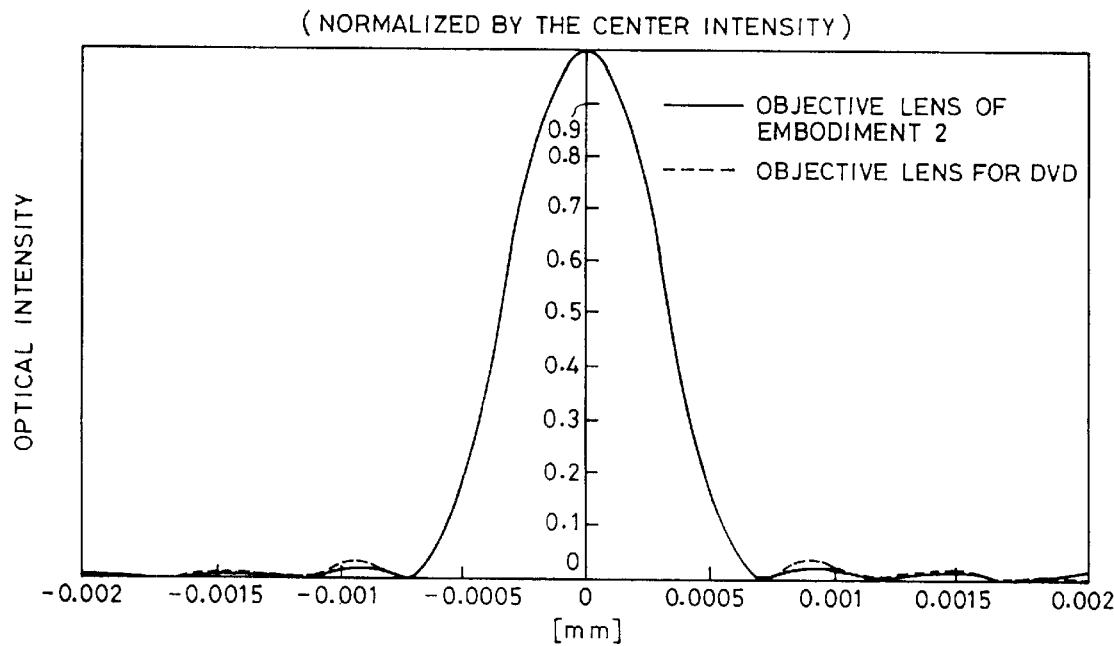
FIG. 16 is a graph showing the wave-optical spot shape intensity on a DVD, normalized by the center intensity at a normalized position from the spot center, according to the objective lens having the wavefront aberration shown in FIG. 15.

FIG. 16 shows the results of calculation of wave-optical spot shapes on the DVD optical disc based on the wavefront aberration of the DVD. In FIG. 16, it is found that a good spot shape has been obtained.

Figure 17:
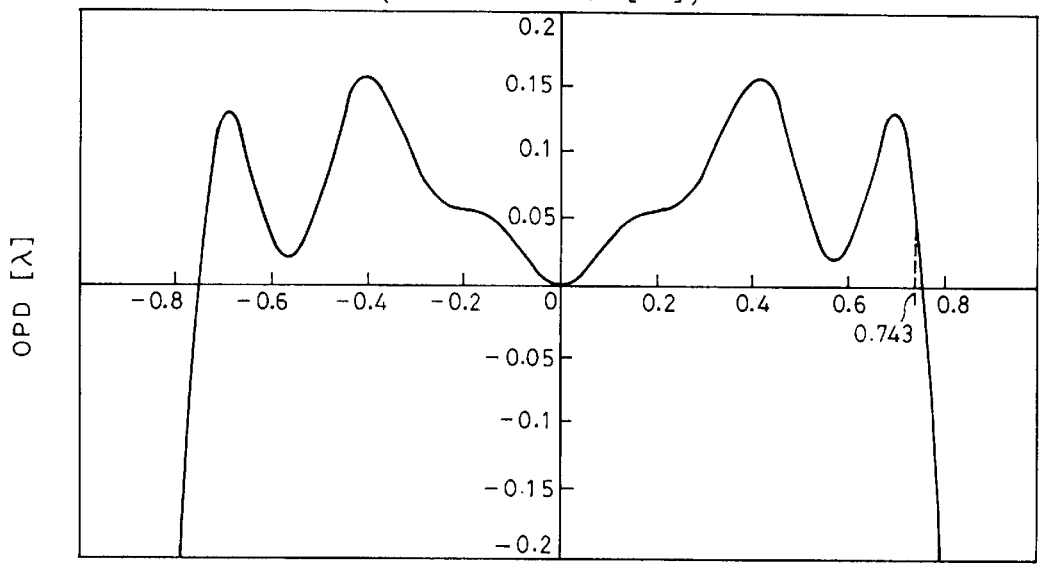
FIG. 17 is a graph showing the shape of a wavefront aberration, on a CD, of an objective lens according to another embodiment of the present invention at a normalized radius position from an optical axis.

Furthermore, FIG. 17 shows the shape of a wavefront aberration of the objective lens obtained for a CD. The wavefront aberration of the numerical aperture up to 0.743 (corresponding to a numerical aperture of 0.452) on the horizontal axis of FIG. 17 is 0.041λ.rms, maintained equal to or less than Marechal's limit, 0.07λ.

Figure 18:
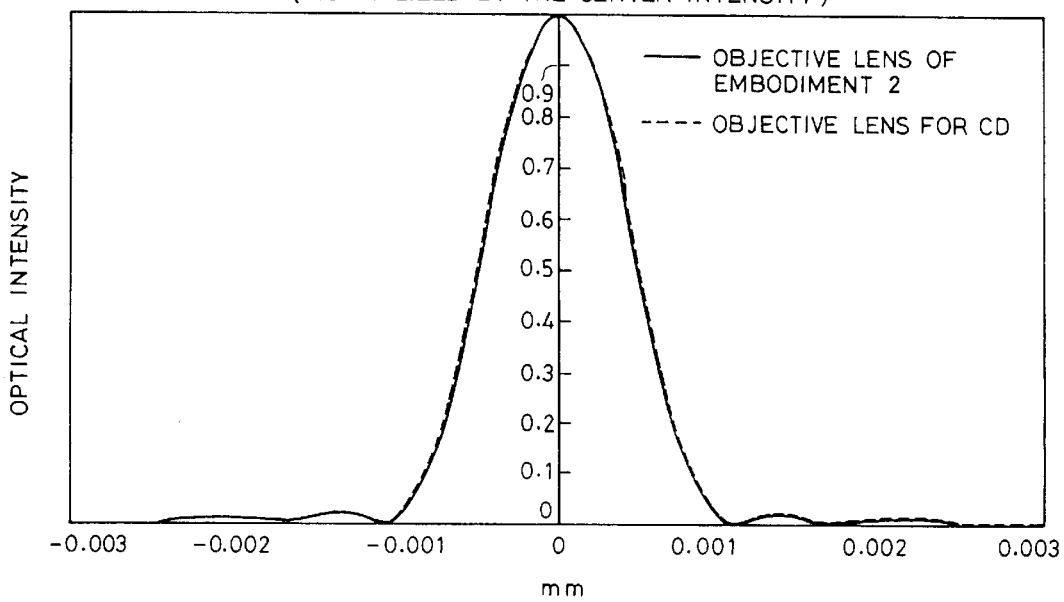
FIG. 18 is a graph showing the wave-optical spot shape intensity on a CD, normalized by the center intensity at a normalized position from the spot center, according to the objective lens having the wavefront aberration shown in FIG. 17.

FIG. 18 shows the results of calculation of wave-optical spot shapes on the CD optical disc based on the wavefront aberration of the CD. In FIG. 18, it is found that a good spot shape has been obtained.

What is claimed is:

1. An aspherical objective lens capable of converging first and second beams of light of first and second wavelengths individually on a first optical disc having a first substrate thickness and on a second optical disc having a second substrate thickness greater than the first substrate thickness at approximately a valid first numerical aperture and a second numerical aperture less than the first numerical aperture, respectively, wherein, a cross section of the objective lens is outlined by a curved line without any step from an inner circumference portion to an outer circumference portion, and a difference between the average values of variations in wavefront aberration corresponding to said inner circumference portion and said outer circumference portion, when said first beam of light converges on said first optical disc having said first substrate thickness, is approximately equal to one wavelength of a beam of light of said first wavelength.

2. The aspherical objective lens according to claim 1, wherein wavefront aberration corresponding to numerical apertures up to a middle circumference portion between said inner and outer circumference portions is equal to or less than Marechal's limit when said second beam of light is converged on said substrate of the second thickness.

3. The aspherical objective lens according to claim 1, wherein said second wavelength is longer than said first wavelength.

4. The aspherical objective lens according to claim 2, wherein said second wavelength is longer than said first wavelength.

5. A method for manufacturing an aspherical objective lens capable of converging first and second beams of light of first and second wavelengths individually on a first optical disc having a first substrate thickness and on a second optical disc having a second substrate thickness greater than the first substrate thickness at approximately a valid first numerical aperture and a second numerical aperture less than the first numerical aperture, respectively, comprising the steps of:

setting parameters for specifying a lens plane of a target lens, having an inner circumference portion around an optical axis, which allows a first beam of said first wavelength to converge almost with no aberration on a transparent substrate having an assumed substrate of a thickness between said first substrate thickness and the second substrate thickness at a third target numerical aperture approximately equal to or less than the second numerical aperture;

calculating an inner circumference average value of variations in a target wavefront aberration corresponding to the inner circumference portion of said target lens in accordance with said parameters when a beam of light of said first wavelength is allowed for converging on an optimal image plane on said first optical disc; and varying and updating said parameters so that the outer circumference portion of said target lens converges almost with no aberration on a transparent substrate having the first substrate thickness, and an average value of variations in the wavefront aberration thereof occurs at a position apart by one wavelength of a beam of light of said first wavelength from said inner circumference average value.

6. The method according to claim 5, wherein said second wavelength is equal to or greater than said first wavelength.

7. An aspherical objective lens, capable of converging a first beam of light of first wavelength on a first optical disc having a first substrate thickness at approximately a first numerical aperture and capable of converging a second beam of light of a second wavelength on a second optical disc having a second substrate thickness greater than the first substrate thickness at approximately a second numerical aperture less than the first numerical aperture, wherein the lens has an inner circumference which delimits an inner region inside the inner circumference and an outer circumference that delimits an outer region outside the outer circumference, wherein a cross section of the objective lens is outlined by a curved line without any step from the inner region to the outer region, and wherein when said first beam of light converges on said first optical disc, the difference between an average value of variations in wavefront aberration for the outer region and an average value of variations in wavefront aberration for the inner region is approximately equal to one wavelength of a beam of light of said first wavelength.

8. The aspherical objective lens of claim 7, wherein when said second beam of light converges on said second optical disc, wherein wavefront aberration for numerical apertures up to a middle circumference region, which is between the inner region and outer region, is equal to or less than Marechal's limit.

9. The aspherical objective lens of claim 7, wherein the second wavelength is longer than the first wavelength.

10. The aspherical objective lens of claim 8, wherein the second wavelength is longer than the first wavelength.

11. A method of manufacturing an aspherical objective lens, capable of converging a first beam of light of first wavelength on a first optical disc having a first substrate thickness at approximately a first numerical aperture and capable of converging a second beam of light of a second wavelength on a second optical disc having a second substrate thickness greater than the first substrate thickness at approximately a second numerical aperture less than the first numerical aperture, comprising the steps of:

(a) setting lens plane parameters for a lens plane of a target lens which allow the first beam of light to converge with almost no aberration on a transparent substrate having an assumed substrate thickness between the first substrate thickness and the second substrate thickness at a third target numerical aperture approximately equal to or less than the second numerical aperture;

wherein the target lens has an inner region around an optical axis, wherein the inner region is inside a delimiting inner circumference and an outer region outside a delimiting outer circumference;

(b) with respect to the previously set lens plane parameters, calculating an inner region average value of variations in a target wavefront aberration for the inner region when the first beam of light converges on an optimal image plane of the first optical disc; and (c) varying and updating the lens plane parameters so that for the outer region the first beam of light converges on a transparent substrate having the first substrate thickness with almost no wavefront aberration, and an average value of variations in the wavefront aberration for the outer region occurs at a position apart by one wavelength of the first beam of light from the calculated average value for the inner region.

12. The method according to claim 11, wherein the second wavelength is equal to or greater than the first wavelength.

* * * * *